A. A. WELLS.
PROCESS FOR MAKING NITRIC ACID FROM AMMONIA.
APPLICATION FILED MAR. 7, 1917.

1,252,976.

Patented Jan. 8, 1918.

WITNESS

INVENTOR.
Alfred A. Wells

UNITED STATES PATENT OFFICE.

ALFRED A. WELLS, OF CALDWELL, NEW JERSEY, ASSIGNOR TO ELLIS-FOSTER COMPANY, A CORPORATION OF NEW JERSEY.

PROCESS FOR MAKING NITRIC ACID FROM AMMONIA.

1,252,976.  Specification of Letters Patent.  Patented Jan. 8, 1918.

Application filed March 7, 1917. Serial No. 153,222.

*To all whom it may concern:*

Be it known that I, ALFRED A. WELLS, a citizen of the United States, and a resident of Caldwell, in the county of Essex and State of New Jersey, have invented certain new and useful Improvements in Processes for Making Nitric Acid from Ammonia, of which the following is a specification.

This invention relates to a process of making nitrous oxids by the oxidation of ammonia, and relates particularly to the catalytic conversion of ammonia to oxids of nitrogen, nitric and nitrous acids, ammonium nitrate and the like.
The present process is concerned with the exposure of a current of ammonia and air or an oxygen-containing gas to a mass of catalytic material under conditions which tend to favor the degree of oxidation thereby enabling high yields of nitric acid to be secured.

Figure 1:
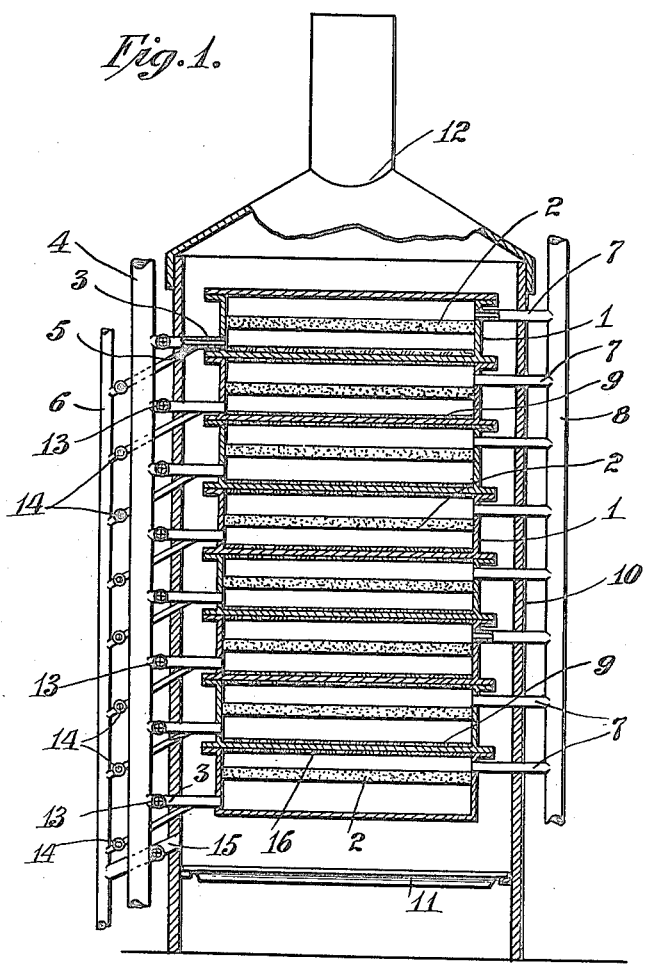
Figure 2:
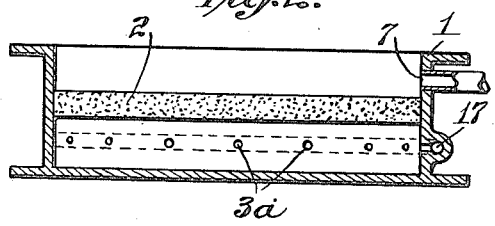
Figure 3:
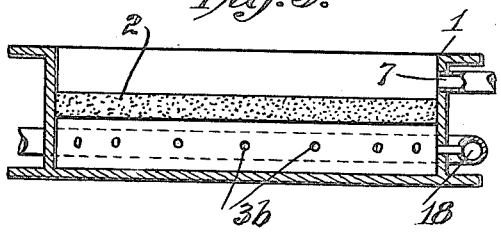

The invention will be illustrated by the accompanying drawings, Figure 1 of which shows mainly in vertical section but part in vertical elevation the preferred form of the apparatus, while Figs. 2 and 3 are vertical cross sections of portions of the apparatus shown in Fig. 1, representing modified types of specific parts thereof. The drawings are of a diagrammatic character intended merely for illustrative purposes.

In Fig. 1, 1 is a catalytic chamber built up of a plurality of sections, each section containing a separate bed or layer of catalytic material, which is indicated on the drawing by 2. 3 is a series of pipes leading from the manifold 4 to sections of the catalytic chamber and serves as an inlet for the mixture of ammonia and air or other oxygen-containing gas. The pipe 4 serves as a supply main for a mixture of ammonia and air, the rate of flow of the gases into the catalytic chamber being governed by valves 13 in the inlet pipes 3. 5 indicates branch pipes leading from the auxiliary air main 6 to the inlet pipes 3. These likewise are controlled by valves 14 as shown. 7 indicates outlet pipes connecting the sections of the catalytic chamber with the discharge manifold 8. 9 indicates septa or plates, which as shown herein are covered both on the top and the bottom with layers of catalytic material, such for example, as a paint or coating carrying catalytic bodies adapted for the oxidation of ammonia. In fact, the entire chamber wherein the ammonia material is oxidized may be so coated, in order to prevent contact of the ammonia with anticatalytic bodies or bodies tending to cause the ammonia to become converted to free nitrogen, which would represent a loss.

15 is an inlet pipe for introducing air into the jacket formed by the housing 10, for the purpose of cooling the apparatus when the temperature increases to too great a degree.
In Fig. 2 the inlet pipe is shown as an annular passage 17 having vents into the catalytic chamber as shown at $3^a$. In Fig. 3 the supply main may take the form of a bustle pipe as shown at 18 with inlet pipe $3^b$.

The operation of the apparatus in carrying out the process of the present invention is as follows:—

Ammonia gas liquor is treated with air to produce a mixture of ammonia and air, preferably in proportion to give a considerably lesser amount of air than that required in carrying out the oxidation process under present conditions. This mixture of ammonia with the deficient supply of air is brought through the main 4 and admitted by the inlet pipes 3 to the lower part of each of the catalytic sections. Of course, ammonia mixtures may be made in other ways than that indicated.

An auxiliary supply of air is furnished by the pipe 6 and is admitted by the inlet pipes 5 as required to make the proper gas mix entering the lower part of the catalytic chamber.

The catalytic beds 2 are made of pervious material such as catalytic bodies supported on platinum, pumice and the like, and various types of catalytic material may be used herein such as platinum, also nickel or cobalt vanadate, or tin chromate in granular form, or fragments of platinum coated more or less with platinum black, various metallic oxids and the like. These beds or layers of catalytic material are preferably relatively thin.

The walls and bottom of the apparatus are preferably coated with a catalytic paint or otherwise suitably treated to prevent contact of the ammonia gas mixture with substances tending to cause the ammonia to burn to nitrogen. The gas mix passes into the lower half of each catalyzer section, moves upwardly through the catalytic mass and collects in the upper part of the catalyzer section and where the products of oxidation are withdrawn through the discharge pipes 7 into the manifold 8, thence conveyed to suitable absorbing apparatus.

The layer of catalytic material on the upper side of each septum may be relatively thin so as to enable a transfer of heat to be obtained from the upper half of the chamber beneath, thus heating the gas mix to the required temperature. Thus the mix flows through the catalytic bed under suitable reacting conditions so that the rate of oxidation is rapid. The hot gases leaving the catalyzer bed come in contact with the upper septum of the particular section containing this catalyzer bed and give up heat to the gas mixture in the lower part of the catalyzer chamber above.

The catalytic material on the lower side of each septum may be omitted while the catalytic material on the other side may be retained, thereby giving a greater transfer of heat.

In this way the ammonia and air mixture while in contact with catalytic material may be heated by absorption of heat from the gases that have been through the catalyzer bed and this regeneration of heat takes place while the incoming gas mixture is in contact with catalyzer so that no undesirable precombustion occurs, such as may happen in the case of regeneration of heat in a chamber where catalytic material is not present as it is now recognized that ammonia admixed with air in an open chamber away from the proper catalytic material has a tendency to burn to nitrogen rather than to oxids of ammonia in many cases and that the presence of such catalyzing material has a stabilizing effect in some way and directs the oxidation of ammonia to produce oxids of nitrogen, thus reducing loss in yield.

In case the temperature in any one section is too high, cold air may be admitted through the pipe 6 to an extent sufficient to reduce the temperature in that particular section. As a general rule the best temperature of oxidation is at a low red heat or between 500 and 700° C. and when the temperature rises much above that point the yields are as a rule not as good.

To recapitulate, my invention relates to the process of oxidizing ammonia wherein a mixture of ammonia and an oxygen-containing gas is admitted to a catalyzer chamber, brought in contact with catalytic material and while in such contact is heated by the heat given out by gases that have passed through an adjacent mass of the catalytic material, such process being carried out in a series of contiguous chambers in heat relating transfer to one another.

What I claim is:—

1. The process of oxidizing ammonia to produce nitrous oxids which comprises passing a mixture of ammonia and air into a catalytic chamber, in allowing the mixture to pass through a bed of catalytic material and in cooling the products of oxidation in heat relating interchange with a gas mixture in a less advanced stage of reaction contained in an adjacent chamber and finally withdrawing the products of oxidation.

2. The process of oxidizing ammonia to produce nitrous oxids which comprises passing a mixture of ammonia and air into a catalytic chamber, the walls of which are coated with catalytic material, in allowing the mixture to pass through a bed of catalytic material and in passing the products of oxidation in heat relating interchange with a gas mixture in a less advanced stage of reaction contained in an adjacent chamber.

3. The process of oxidizing ammonia to produce nitrous oxids which comprises passing a mixture of ammonia and air into a plurality of catalytic chambers, in allowing the mixture to pass through layers of catalytic material and in passing the products of oxidation in heat relating interchange with a gas mixture in a less advanced stage of reaction contained in adjacent chambers and finally withdrawing the products of oxidation.

4. In the process of oxidizing ammonia to produce oxids of nitrogen, the step which comprises passing a mixture of air and ammonia through a catalytic chamber without substantial contact of the gaseous mixture in said chamber with any surface of a non-catalytic character.

5. In the process of oxidizing ammonia to produce oxids of nitrogen with minimum production of nitrogen, the step which comprises passing a mixture of ammonia and an oxygen-containing gas through a heated catalytic chamber, the surfaces of which with which the gaseous mixture comes in contact being coated with catalytic material having oxidizing properties.

ALFRED A. WELLS.